(12) United States Patent
Kim et al.

(10) Patent No.: US 11,107,250 B2
(45) Date of Patent: Aug. 31, 2021

(54) COMPUTER ARCHITECTURE FOR ARTIFICIAL IMAGE GENERATION USING AUTO-ENCODER

(71) Applicant: Raytheon Company, Waltham, MA (US)

(72) Inventors: Peter Kim, Irvine, CA (US); Michael J. Sand, Torrance, CA (US); Matthew D. Hollenbeck, Hawthorne, CA (US)

(73) Assignee: Raytheon Company, Waltham, MA (US)

( * ) Notice: Subject to any disclaimer, the term of this patent is extended or adjusted under 35 U.S.C. 154(b) by 99 days.

(21) Appl. No.: 16/550,040

(22) Filed: Aug. 23, 2019

(65) Prior Publication Data

US 2020/0167966 A1 May 28, 2020

Related U.S. Application Data

(60) Provisional application No. 62/771,808, filed on Nov. 27, 2018.

(51) Int. Cl.
*G06T 9/00* (2006.01)
*G06N 20/10* (2019.01)
(Continued)

(52) U.S. Cl.
CPC .......... *G06T 9/001* (2013.01); *G06K 9/00201* (2013.01); *G06K 9/6265* (2013.01);
(Continued)

(58) Field of Classification Search
CPC ......... G06T 9/001; G06T 15/60; G06T 17/00; G06N 20/10; G06N 3/08; G06K 9/00201; G06K 9/6256
See application file for complete search history.

(56) References Cited

U.S. PATENT DOCUMENTS 10,229,346 B1 * 3/2019 Kim .................. G06K 9/6262
2017/0350974 A1 * 12/2017 Korchev ................ G01S 7/412
(Continued)

FOREIGN PATENT DOCUMENTS

WO 2017087653 5/2017

OTHER PUBLICATIONS

Deng, Sheng, Lan Du, Chen Li, Jun Ding, and Hongwei Liu. "SAR automatic target recognition based on Euclidean distance restricted autoencoder." IEEE Journal of Selected Topics in Applied Earth Observations and Remote Sensing 10, No. 7 (2017): 3323-3333.*
(Continued)

*Primary Examiner* — Zhitong Chen
(74) *Attorney, Agent, or Firm* — Schwegman Lundberg & Woessner, P.A.

(57) ABSTRACT

A computer architecture for artificial image generation is disclosed. According to some aspects, a computing machine receives a voxel model of a first set of objects different from a target object. The target object is to be recognized using an image recognizer. The computing machine generates, based on the voxel model, a set of TSB (target shadow background-mask) images of the first set of objects. The computing machine receives, at an auto-encoder, a set of real images of the first set of objects. The computing machine generates, using the auto-encoder, one or more artificial images of the target object based on the set of TSB images. The auto-encoder learns differences between the target object and the first set of objects. The computing machine provides, as output, the generated one or more artificial images of the target object.

18 Claims, 9 Drawing Sheets

(51) Int. Cl.
    *G06K 9/00*       (2006.01)
    *G06N 3/08*       (2006.01)
    *G06T 15/60*     (2006.01)
    *G06T 17/00*     (2006.01)
    *G06K 9/62*       (2006.01)

(52) U.S. Cl.
    CPC .............. *G06N 3/08* (2013.01); *G06N 20/10* (2019.01); *G06T 15/60* (2013.01); *G06T 17/00* (2013.01)

(56) References Cited

U.S. PATENT DOCUMENTS

2018/0322623 A1\* 11/2018 Memo .................... G06N 3/084
2018/0336434 A1   11/2018 Kicanaoglu et al.
2020/0065635 A1\*  2/2020 Lim ..................... G06K 9/6257

OTHER PUBLICATIONS

Touafria, Mohamed, and Qiang Yang. "A Concurrent and Hierarchy Target Learning Architecture for Classification in SAR Application." Sensors 18, No. 10 (2018): 3218.\*

"International Application Serial No. PCT US2019 047993, International Search Report dated Dec. 2, 2019", 5 pgs.

"International Application Serial No. PCT US2019 047993, Written Opinion dated Dec. 2, 2019", 6 pgs.

Malmgren-Hansen, David, "Improving SAR Automatic Target Recognition Models With Transfer Learning From Simulated Data", IEEE Geoscience and Remote Sensing Letters vol. 14, No. 9, (Sep. 1, 2017), 1484-1488.

"International Application Serial No. PCT/US2019/047993, International Preliminary Report on Patentability dated Jun. 10, 2021", 8 pgs.

\* cited by examiner

COMPUTER ARCHITECTURE FOR ARTIFICIAL IMAGE GENERATION USING AUTO-ENCODER

PRIORITY CLAIM

This application claims priority under 35 U.S.C. § 119 to U.S. Provisional Patent Application Ser. No. 62/771,808, filed Nov. 27, 2018, and titled, "COMPUTER ARCHITECTURE FOR ARTIFICIAL IMAGE GENERATION USING AUTO-ENCODER," which is incorporated herein by reference in its entirety.

TECHNICAL FIELD

Embodiments pertain to computer architecture. Some embodiments relate to a computer architecture for machine learning. Some embodiments relate to a computer architecture for generating artificial images for use in machine learning.

BACKGROUND

Machine learning is useful for many purposes, such as image recognition. In some cases, a large number of images are available to train machine(s) to recognize images of a given object. However, for some other objects, few images or no images at all are available. As the foregoing illustrates, it may be desirable to use machine learning to train machine(s) to recognize a given object, where there are few or no images available of that given object.

SUMMARY

Figure 1:
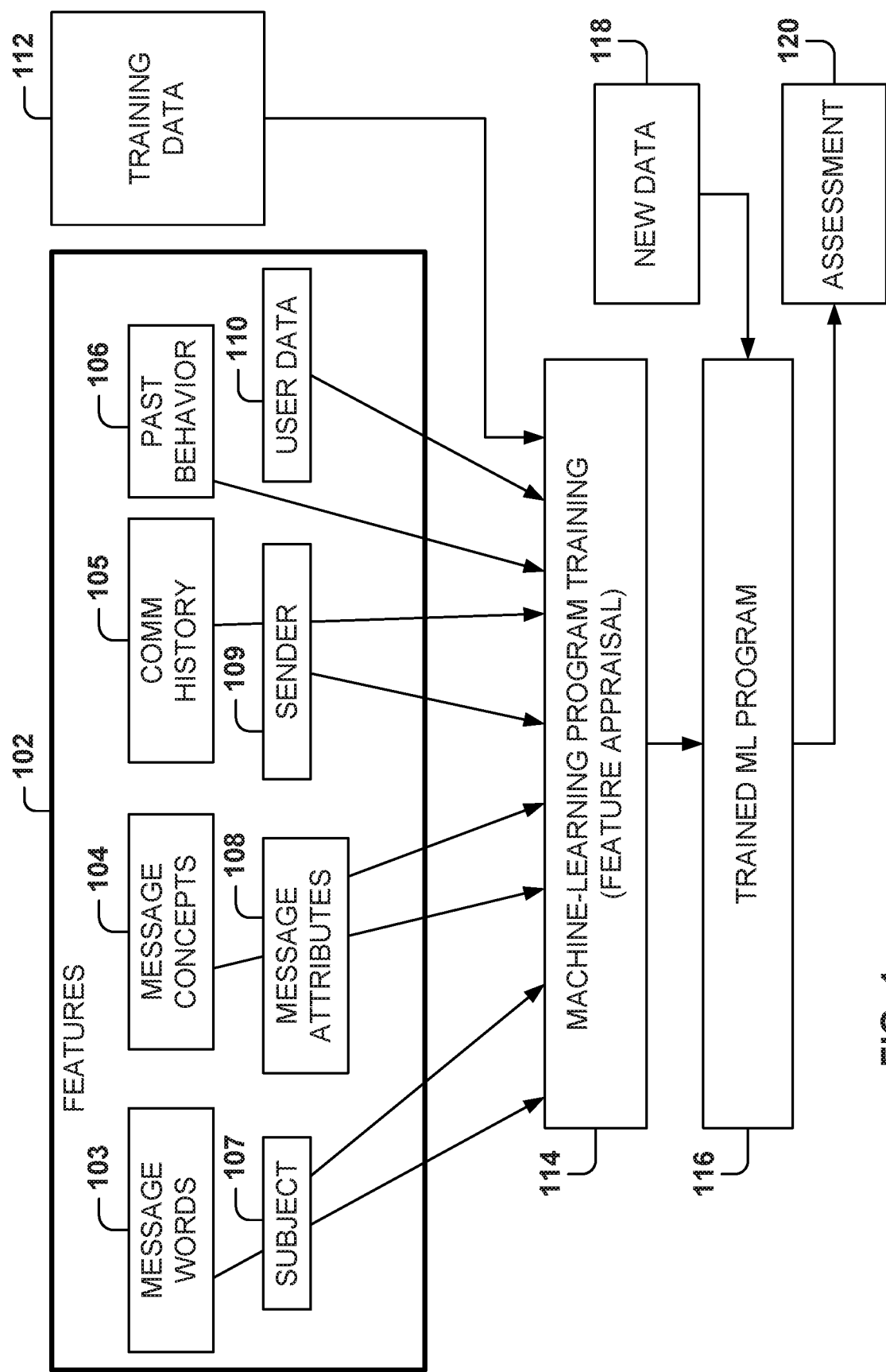
FIG. 1 illustrates the training and use of a machine-learning program, in accordance with some embodiments.

The present disclosure generally relates to machines configured to provide artificial image generation, including computerized variants of such special-purpose machines and improvements to such variants, and to the technologies by which such special-purpose machines become improved compared to other special-purpose machines that provide technology for neural networks. In particular, the present disclosure addresses systems and methods for artificial image generation.

According to some aspects of the technology described herein, a machine learning apparatus include processing circuitry and memory. The processing circuitry receives, as input, a set of real SAR (synthetic-aperture radar) images of a target object, wherein the target object is to be recognized using an image recognizer. The processing circuitry generates, based on the set of real SAR images, a voxel model of the target object. The processing circuitry generates, based on the voxel model, a set of TSB (target shadow background-mask) images of the target object. The processing circuitry generates, using an auto-encoder, one or more artificial SAR images of the target object based on the set of TSB images, wherein the auto encoder encodes, using a sub-encoder, the set of TSB images into a latent vector and decodes, using a sub-decoder, the latent vector to generate the one or more artificial SAR images. The processing circuitry provides, as output, the generated one or more artificial SAR images of the target object.

According to some aspects of the technology described herein, a machine learning apparatus include processing circuitry and memory. The processing circuitry receives, as input, a set of real SAR (synthetic-aperture radar) images of a first set of objects, and a set of differences between the first set of objects and a target object different from the first set of objects, wherein the target object is to be recognized using an image recognizer. The processing circuitry generates, based on the set of real SAR images of the first set of objects and the set of differences, a voxel model of the target object. The processing circuitry generates, based on the voxel model, a set of TSB (target shadow background-mask) images of the target object. The processing circuitry generates, using an auto-encoder, one or more artificial SAR images of the target object based on the set of TSB images, wherein the auto encoder encodes, using a sub-encoder, the set of TSB images into a latent vector and decodes, using a sub-decoder, the latent vector to generate the one or more artificial SAR images. The processing circuitry provides, as output, the generated one or more artificial SAR images of the target object.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, machine learning is useful for many purposes, such as image recognition. In some cases, a large number of images are available to train machine(s) to recognize images of a given object. For example, there exist a large number of images of Boeing 747® airplanes. However, for some other objects (e.g. some less well-known type of airplane), few images or no images at all are available. As the foregoing illustrates, it may be desirable to use machine learning to train machine(s) to recognize a given object, where there are few or no images available of that given object.

In some cases, few images or no images at all of a target object may be available, but a user may wish to train an image recognition neural network to identify images of the target object. Some aspects of the technology described herein provide a solution to this technological problem by artificially generating images of the target object. This increases the amount of training data for the image recognition neural network, and thereby increases the classification accuracy of the trained image recognition neural network.

Some aspects of the technology described herein are directed to using machine learning to train machine(s) to recognize a target object, where there are few or no images available of the target object. In order to do this, synthetic images of the target object may be generated, and the synthetic images, along with any available real images of the target object, may be used to train machine(s) to recognize image(s) of the target object.

As used herein, the term "object" encompasses its plain and ordinary meaning. An object may include, among other things, anything that may be depicted in an image that may be recognized via machine learning. Examples of objects are: an airplane, a Boeing 747® airplane, a car, a Honda Civic®, a sport utility vehicle (SUV), a human face, the face of President Donald Trump, a dog, a golden retriever, a mobile phone, a Samsung Galaxy® mobile phone, and the like.

According to some implementations, a small number (e.g. fewer than a threshold, such as 100, 1000 or 10,000) of real images of a target object are available. A computing machine (or multiple computing machines) receives, at an auto-encoder, a set of TSB (target shadow background-mask) images of a target object to be recognized using an image recognizer. The computing machine receives, at the auto-encoder, a set of real images of the target object. The computing machine generates, using an auto-encoder, one or more artificial images of the target object based on the set of TSB images. The auto encoder encodes, using a sub-encoder, the set of TSB images into a latent vector and decodes, using a sub-decoder, the latent vector to generate the one or more artificial images. The computing machine provides, as output, the generated one or more artificial images of the target object. The generated artificial images and the real images are used to train the image recognizer to identify images of the target object. A training set for the image recognizer may include both the artificial images and the real images. The real and artificial images may be SAR (synthetic-aperture radar) images or any other type of 2D (two-dimensional) images.

According to some implementations, no real images of the target object are available, but a number of images of a first set of objects, which is similar to the target object, are available. For example, there may be images of the Honda Civic® available, but no images of Car XYZ, and it may be desirable to train a machine learning algorithm to recognize images of Car XYZ. The first set of objects may include a single object or multiple objects. A computing machine (or multiple computing machines) receives, as input, a set of real SAR images of the first set of objects (e.g. the Honda Civic®), and a set of differences between the first set of objects and the target object (e.g. a set of differences between the Honda Civic® and Car XYZ, such as the Honda Civic has a Honda® emblem on it, while Car XYZ has a XYZ emblem on it in place of the Honda® emblem). A computing machine receives, at an auto-encoder, a set of TSB images of a target object that is to be recognized using an image recognizer. The computing machine receives, at an auto-encoder, a set of real images of the first set of objects (e.g. the Honda Civic®) and a set of differences between the first set of objects and the target object (e.g. a set of differences between the Honda Civic® and Car XYZ, such as the Honda Civic has a Honda® emblem on it, while Car XYZ has a XYZ emblem on it in place of the Honda® emblem). The computing machine generates, using the auto-encoder and based on the set of real images of the first set of objects and the set of differences, one or more artificial images of the target object based on the set of TSB images. The auto encoder encodes, using a sub-encoder, the set of TSB images into a latent vector and decodes, using a sub-decoder, the latent vector to generate the one or more artificial images. The computing machine provides, as output, the generated one or more artificial images of the target object. The generated artificial images are used to train a machine learning algorithm to identify images of the target object. The real and artificial images may be SAR (synthetic-aperture radar) images or any other type of 2D images.

The auto-encoder may be implemented in hardware or in software. The auto-encoder may reside within the computing machine or may reside externally to the computing machine.

As used herein, a "real" image may include an image that corresponds to something that exists in the real world. For example, a person may use a digital camera to take a picture of a Boeing 747 airplane to obtain a real image of the Boeing 747 airplane. As used herein, an "artificial" image may include a machine-generated image that does not correspond to something that exists in the real world. For example, a machine may generate an image of a Boeing 747 airplane based on a voxel model, a set of TSB images, or any other two or three-dimensional model of the Boeing 747 airplane. In addition, the terms "real" and "artificial" encompass their plain and ordinary meanings.

Aspects of the technology described herein are described in using SAR imagery. However, in alternative embodiments, any type of 2D imagery may be used in place of SAR imagery. For example, any type of 2D image(s) may be used in place of the SAR image(s), as described throughout this document.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
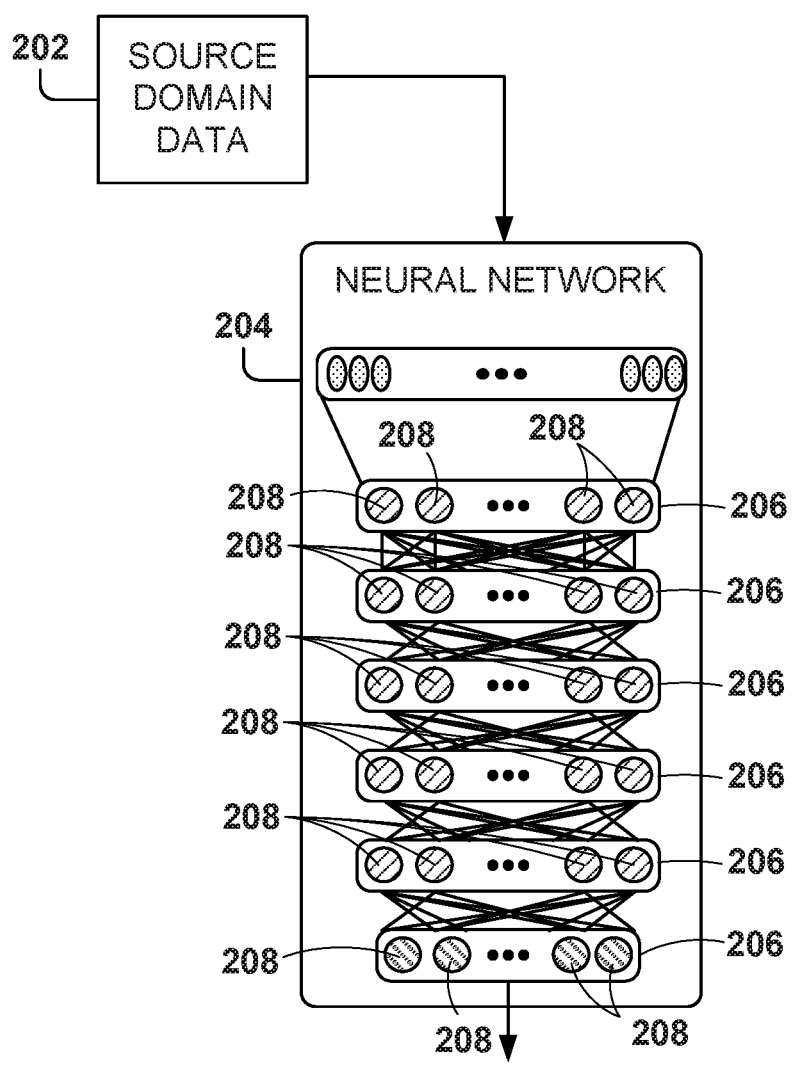
FIG. 2 illustrates an example neural network, in accordance with some embodiments.
Figure 2:
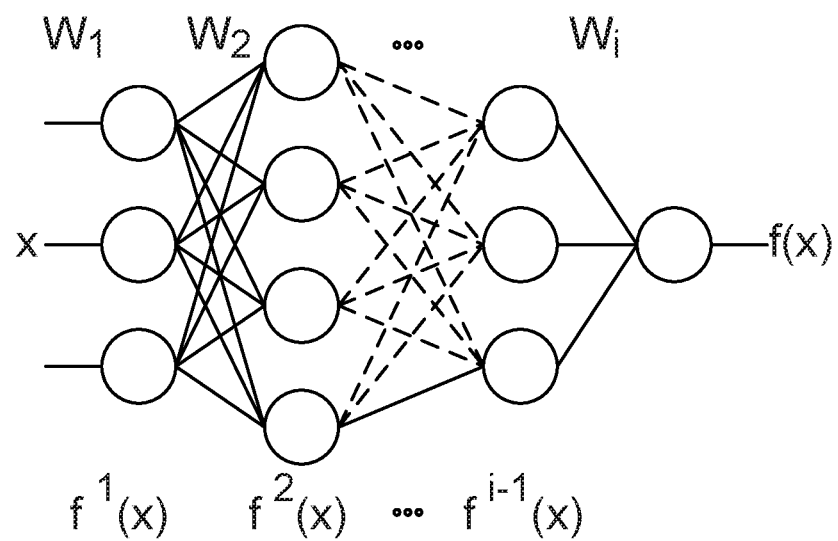

FIG. 2 illustrates an example neural network 204, in accordance with some embodiments. As shown, the neural network 204 receives, as input, source domain data 202. The input is passed through a plurality of layers 206 to arrive at an output. Each layer includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
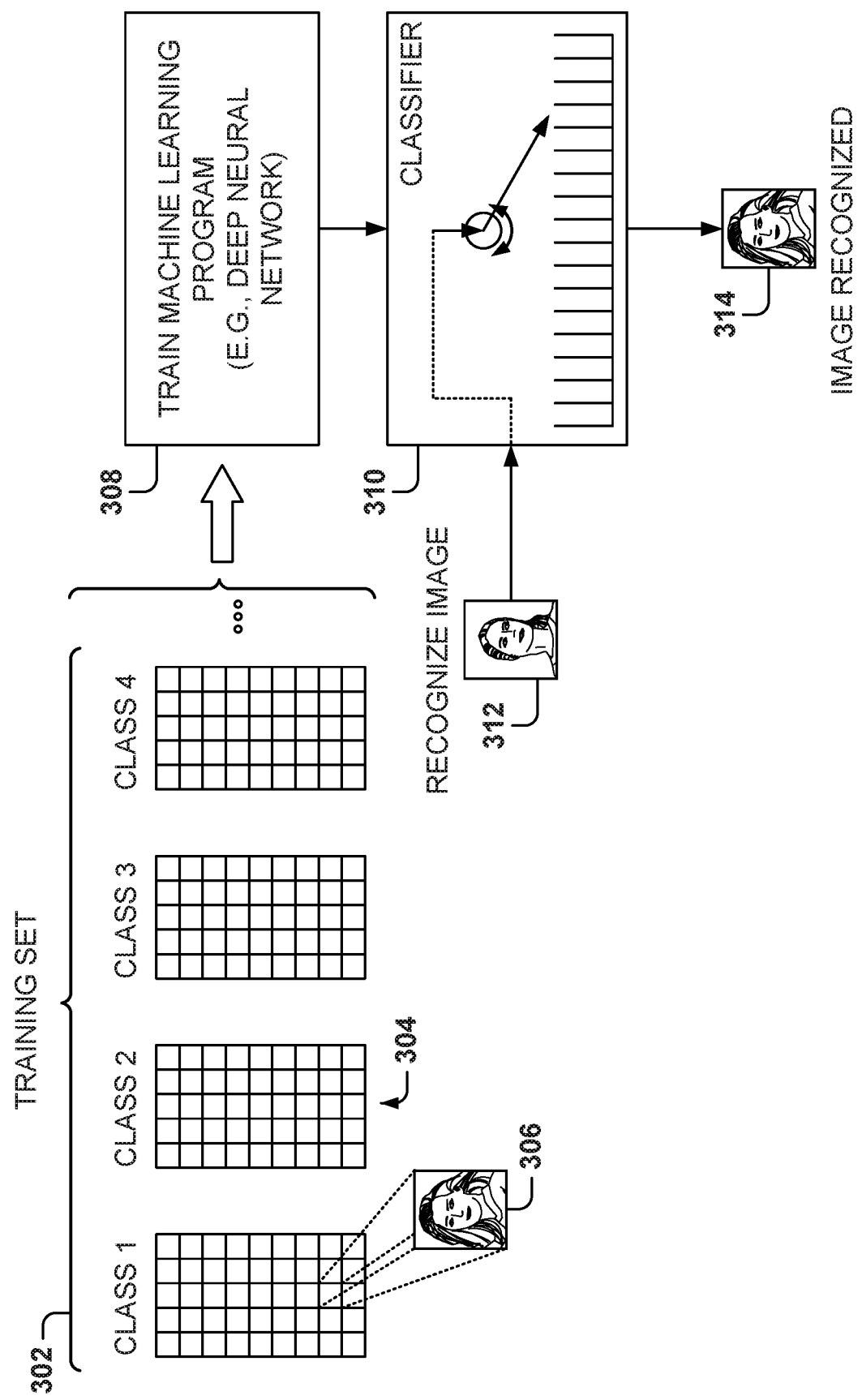
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
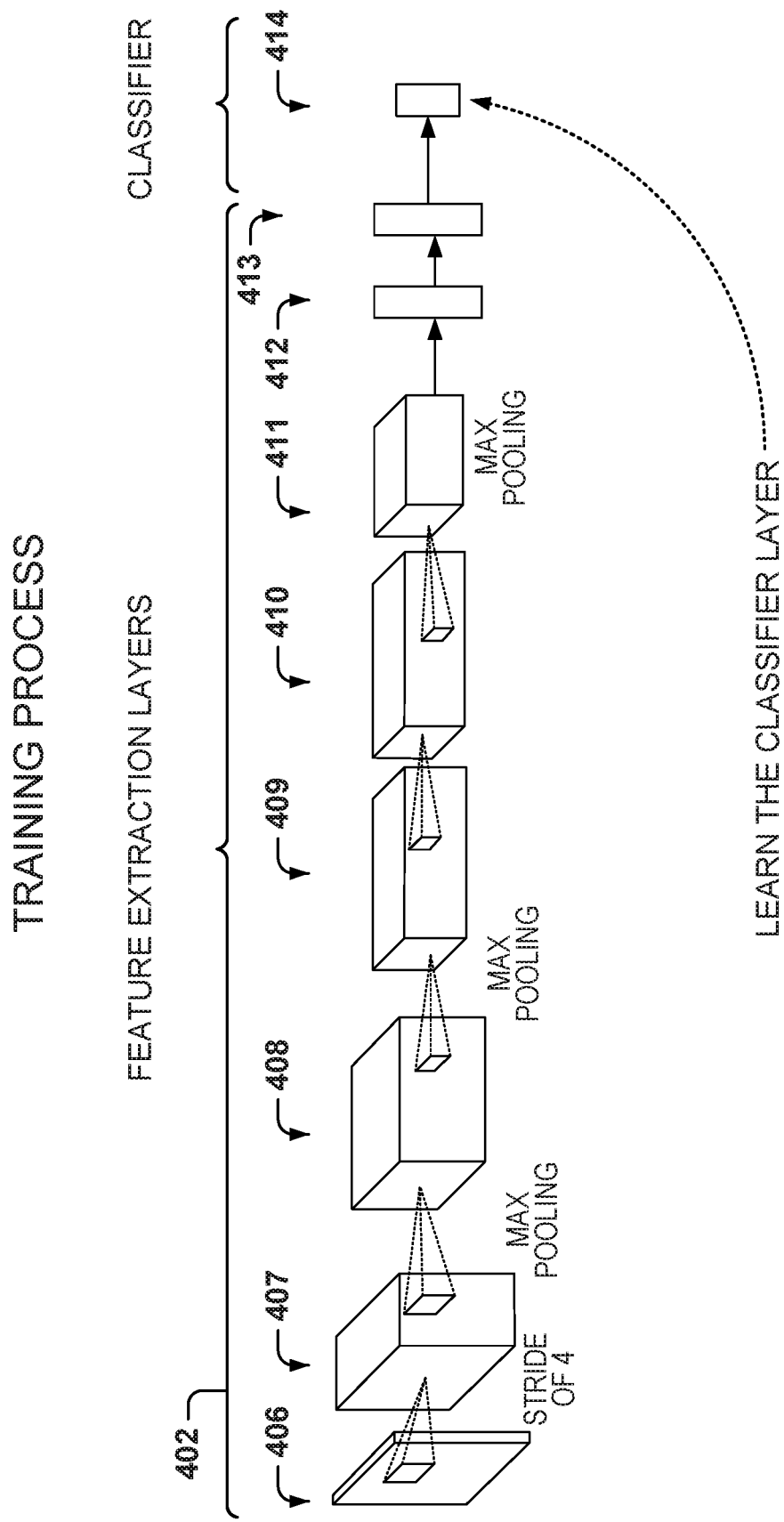
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
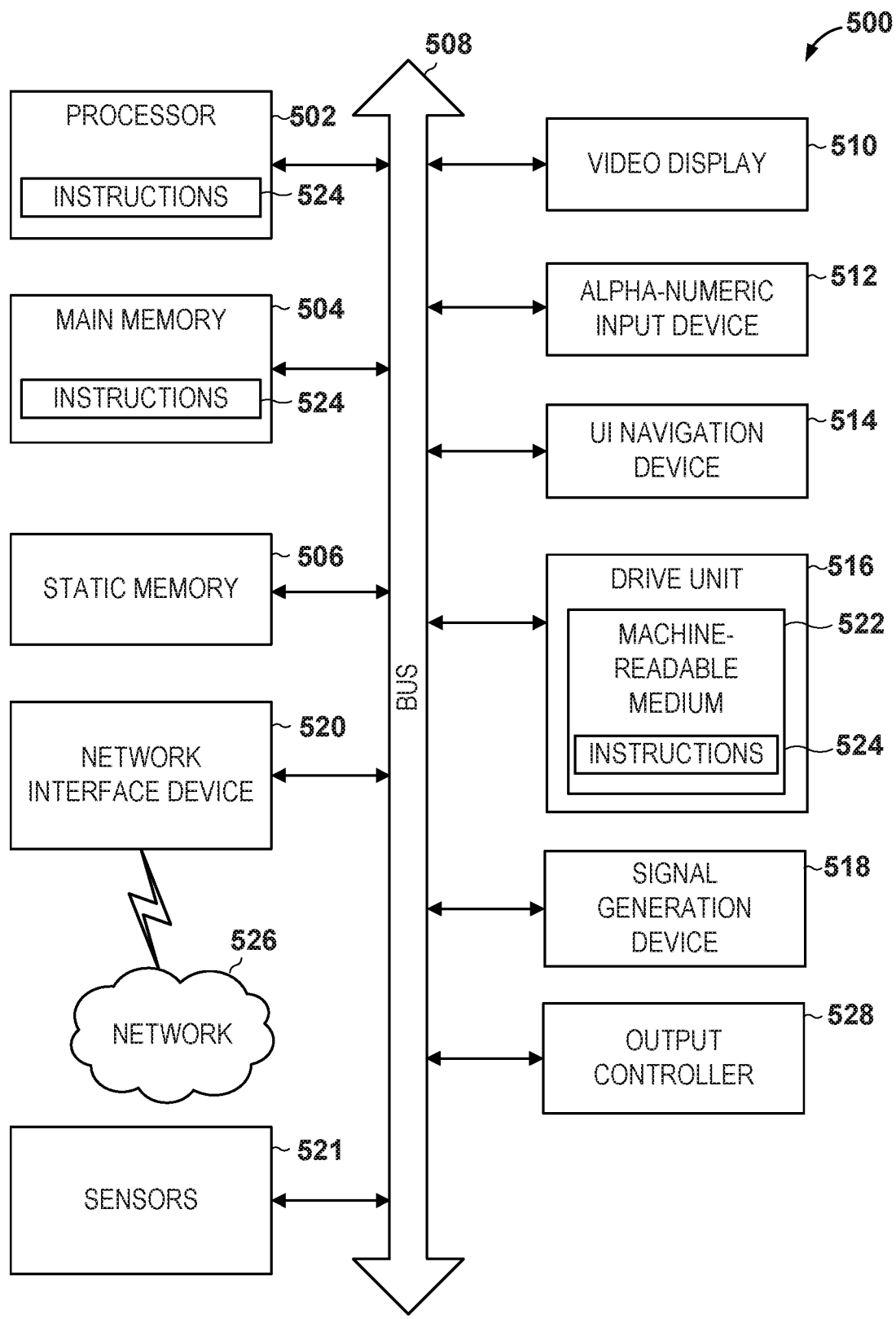
FIG. 5 is a block diagram of a computing machine, in accordance with some embodiments.

FIG. 5 illustrates a block diagram of a computing machine 500 in accordance with some embodiments. In some embodiments, the computing machine 500 may store the components shown in the circuit block diagram of FIG. 5. For example, the circuitry 500 may reside in the processor 502 and may be referred to as "processing circuitry." In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
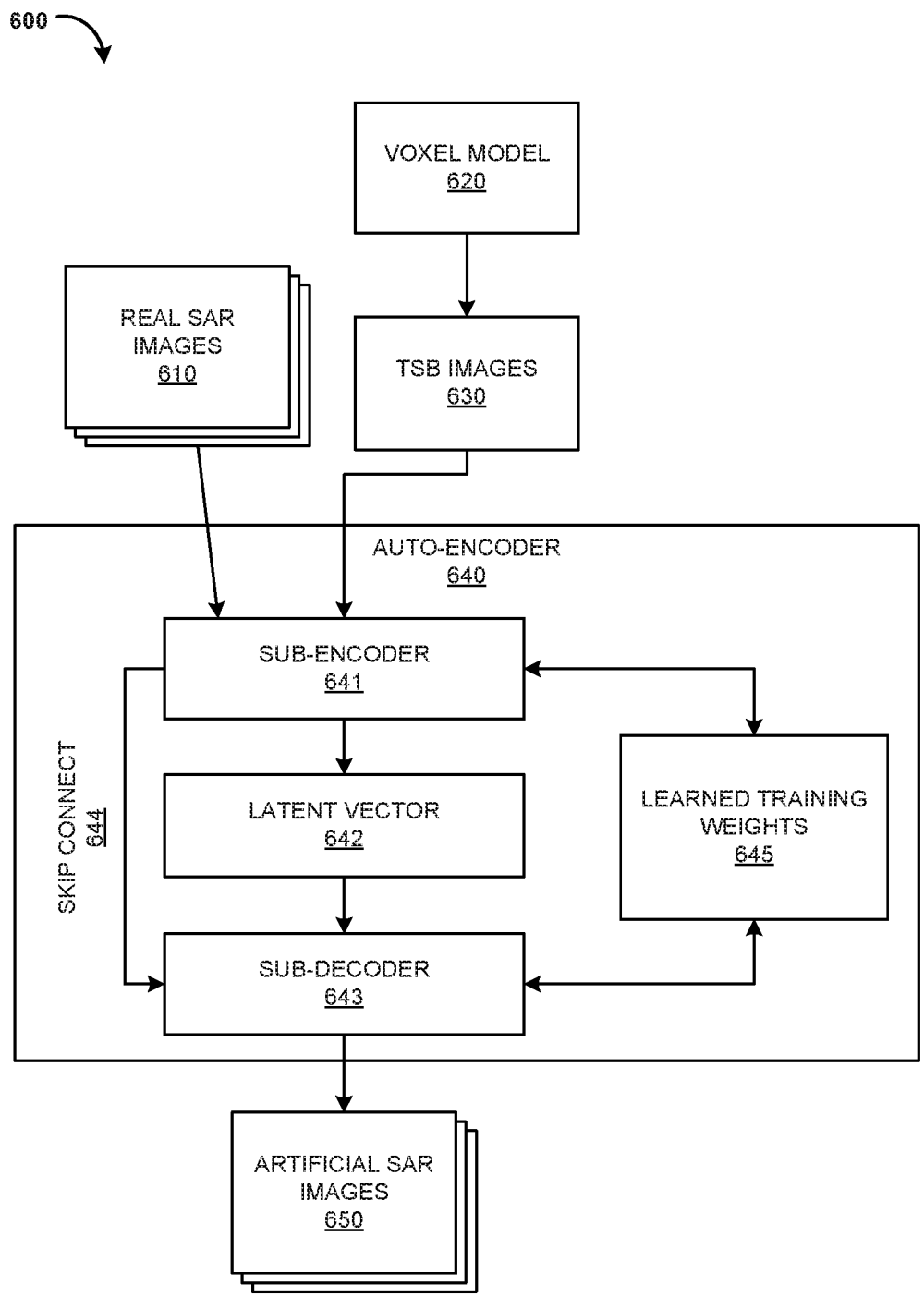
FIG. 6 is a data flow diagram for artificial image generation, in accordance with some embodiments.

FIG. 6 is a data flow diagram 600 for artificial image generation, in accordance with some embodiments. As shown in the data flow diagram 600, a set of real SAR images 610 is provided to a sub-encoder 641 of an auto-encoder 640. In some examples, the set of real SAR images 610 corresponds to a target object, which is to be recognized using an image recognizer. In some examples, the set of real SAR images 610 corresponds to a first set of objects, different from the target object, and a set of differences between the first set of objects and the target object are represented in the set of TSB images 630 (there may not be any real SAR images of the target object). As shown, the data flow diagram 600 includes a voxel model 620. The voxel model 620 is a three dimensional grid (3D) model of the target object. The voxel model 620 includes a plurality of voxels, which are positions in a 3D grid that correspond to the edges of a target object. The voxel model 620 is used to generate a set of TSB images 630 of the target object. The set of TSB images 630 includes representations of the background, the target object, and a shadow of the target object. The position of the shadow of the target object may be calculated based on the voxel model 620 of the target object, the background texture, and an assigned, estimated, or identified position of light source(s) (e.g. lamp(s) or the sun).

The set of TSB images 630 of the target object is provided to the auto-encoder 640, which generates the artificial SAR images 650 of the target object. As shown, the auto-encoder includes a sub-encoder 641, which generates a latent vector 642. The latent vector 642 is fed to a sub-decoder 643, which generates the artificial SAR images 650. Skip connect(s) 644 allow for direct connection from the sub-encoder 641 to the sub-decoder 643. The sub-encoder 641 and the sub-decoder 643 access learned training weights 645, which are learned via machine learning techniques. The sub-encoder 641 receives the input for the auto-encoder 640: the set of TSB images 630 and the real SAR images 610.

According to some examples, the sub-encoder 641 includes multiple convolution layers and multiple pooling layers interspersed with the convolution layers. The sub-encoder 641 is trained, using a first machine learning training algorithm, to generate the latent vector 642 based on the set of TSB images 630. According to some examples, the sub-decoder 643 includes multiple deconvolution layers and multiple depooling layers interspersed with the deconvolution layers. The sub-decoder 643 is trained, using a second machine learning training algorithm, to generate the one or more artificial SAR images 650 based on the latent vector 642.

The auto-encoder 640 may be coded in JSON (JavaScript Object Notation) or any other programming language. In some cases, the auto-encoder 640 may be a hardware device or the auto-encoder may be part software and part hardware. Example JSON code for the auto-encoder 640 appears in Appendix A.

In some examples, as illustrated in Appendix A, the sub-encoder 641 includes multiple convolution pools. Each convolution pool is followed by a batch normalization. Each batch normalization is followed by a ReLU (rectified linear unit). Furthermore, a kernel size of each convolution pool of the sub-encoder 641 is larger than a kernel size of a previous convolution pool of the sub-encoder 641.

In some examples, as illustrated in Appendix A, the sub-decoder 643 includes multiple skip connects. Each skip connect is followed by a batch normalization. Each batch normalization is followed by a ReLU. Each ReLU is followed by a decode convolution. Furthermore, a kernel size of each decode convolution of the sub-decoder 643 is smaller than a kernel size of a previous decode convolution of the sub-decoder 643.

Appendix A illustrates example JSON code for the auto-encoder 640. However, it should be noted that different JSON code or different code in another programming language may be used to implement the auto-encoder 640. In some cases, the auto-encoder 640 is implemented fully or partially in hardware.

Figure 7:
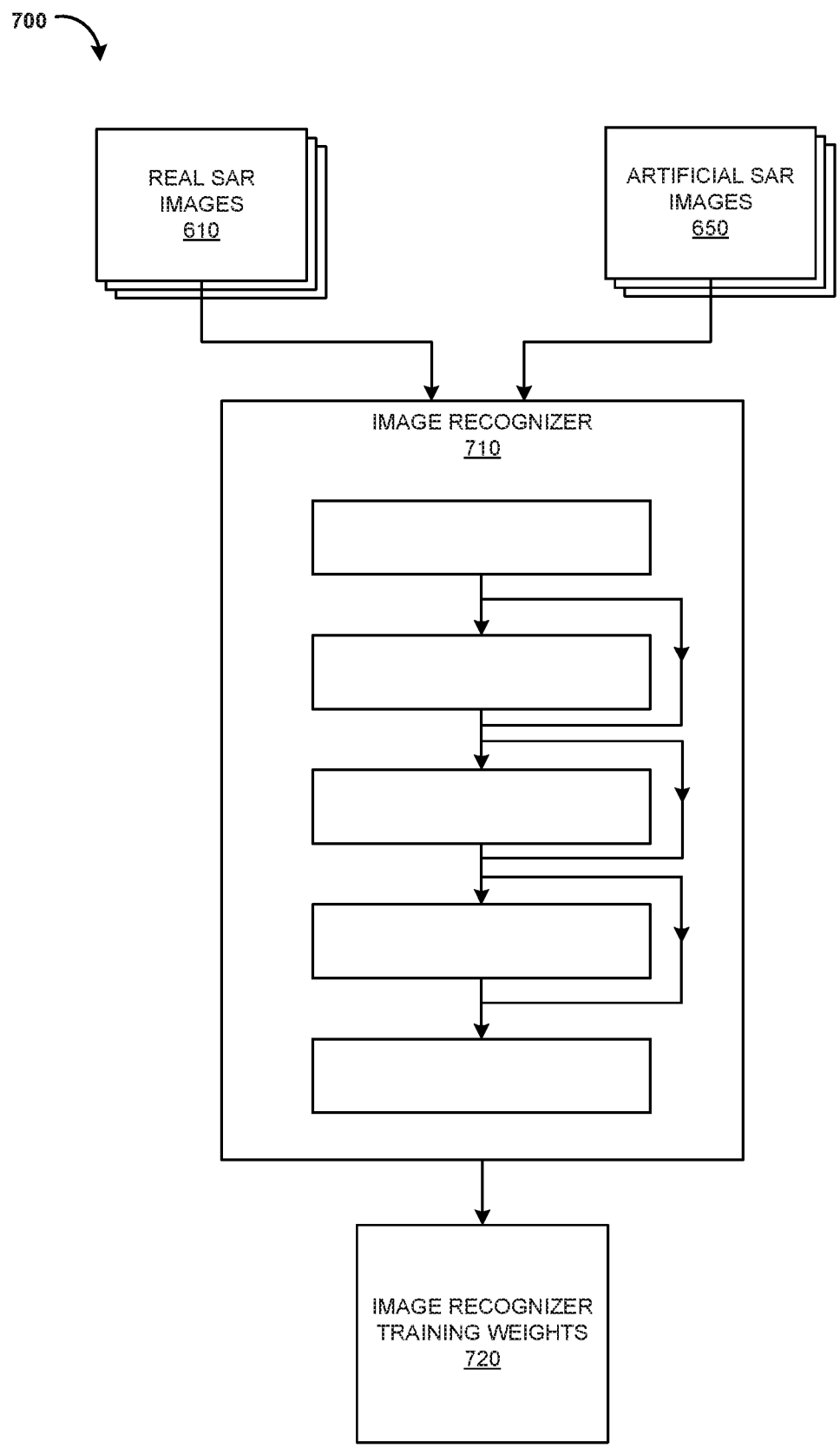
FIG. 7 is a data flow diagram for training an image recognizer using real and artificial image(s), in accordance with some embodiments.

FIG. 7 is a data flow diagram 700 for training an image recognizer using real and artificial image(s), in accordance with some embodiments. As shown, the real and artificial image(s) may correspond to the real SAR images 610 and the artificial SAR images 650 from FIG. 6. The real SAR images 610 and the artificial SAR images 650 are provided to the image recognizer 710 to train the image recognizer 710 to recognize the target object. The image recognizer 710 may be a ResNet (residual neural network), and any technique for training a ResNet may be used. In some cases, if there are no real SAR images 610 of the target object (or the real SAR images 610 correspond to a first set of objects different from the target object), only the artificial SAR images 650 (and not the real SAR images 610) are used to train the image recognizer 710 in conjunction with the image recognizer training weights 720, which may be learned during the training using machine learning techniques. After training, the image recognizer 710 may output an indication that the image recognizer 710 has been trained. After the image recognizer 710 has been trained, the image recognizer 710 may be used to recognize image(s) of the target object and/or to recognize the target object in image(s).

Figure 8:
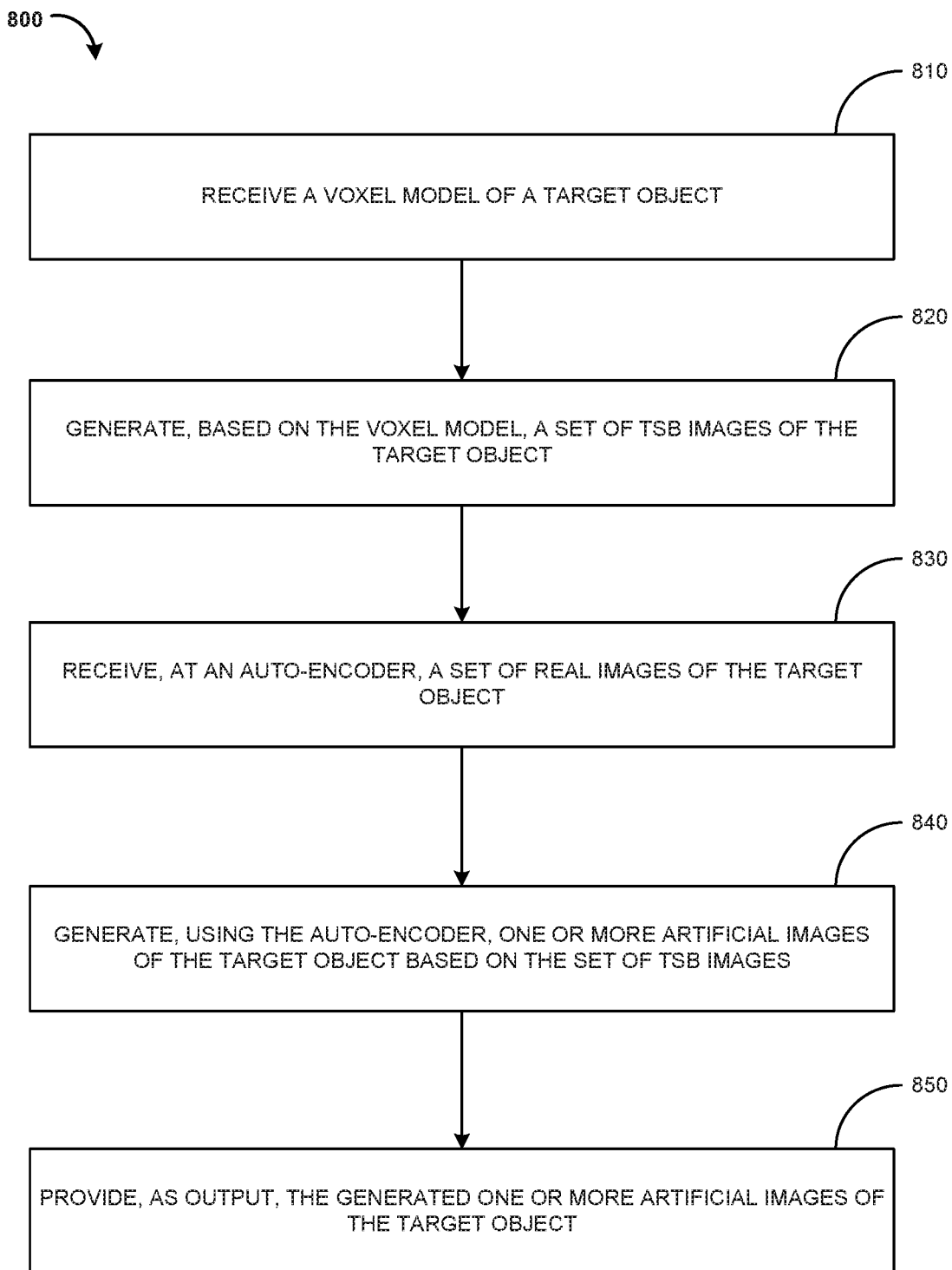
FIG. 8 is a flow chart of a first method for artificial image generation, in accordance with some embodiments.

FIG. 8 is a flow chart of a first method 800 for artificial image generation, in accordance with some embodiments. The method 800 may be implemented at computing machine (s), such as the computing machine 500.

At operation 810, the computing machine(s) receive a voxel model 620 of a target object. The target object is to be recognized using an image recognizer 710.

At operation 820, the computing machine(s) generate, based on the voxel model 620, a set of TSB images 630 of the target object.

At operation 830, the computing machine(s) receive, at an auto-encoder 640, a set of real images 610 of the target object.

At operation 840, the computing machine(s) generate, using the auto-encoder 640, one or more artificial SAR images 650 of the target object based on the set of TSB images 630. The auto-encoder 640 encodes, using a sub-encoder 641, the set of TSB images 630 into a latent vector 642. The auto-encoder 640 decodes, using a sub-decoder 643, the latent vector 642 to generate the one or more artificial SAR images 650.

At operation 850, the computing machine(s) provide, as output, the generated one or more artificial SAR images 650 of the target object. In some cases, the computing machine(s) train, using the set of real SAR images 610 and the one or more artificial SAR images 650, the image recognizer 710 to recognize the target object. The computing machine(s) provide, as output, an indication that the image recognizer has been trained. The computing machine(s) may use the image recognizer to recognize a new image of the target object, where the new image is not from among the set of real SAR images 610 and/or the one or more artificial SAR images 650. After operation 850, the method 800 ends.

Figure 9:
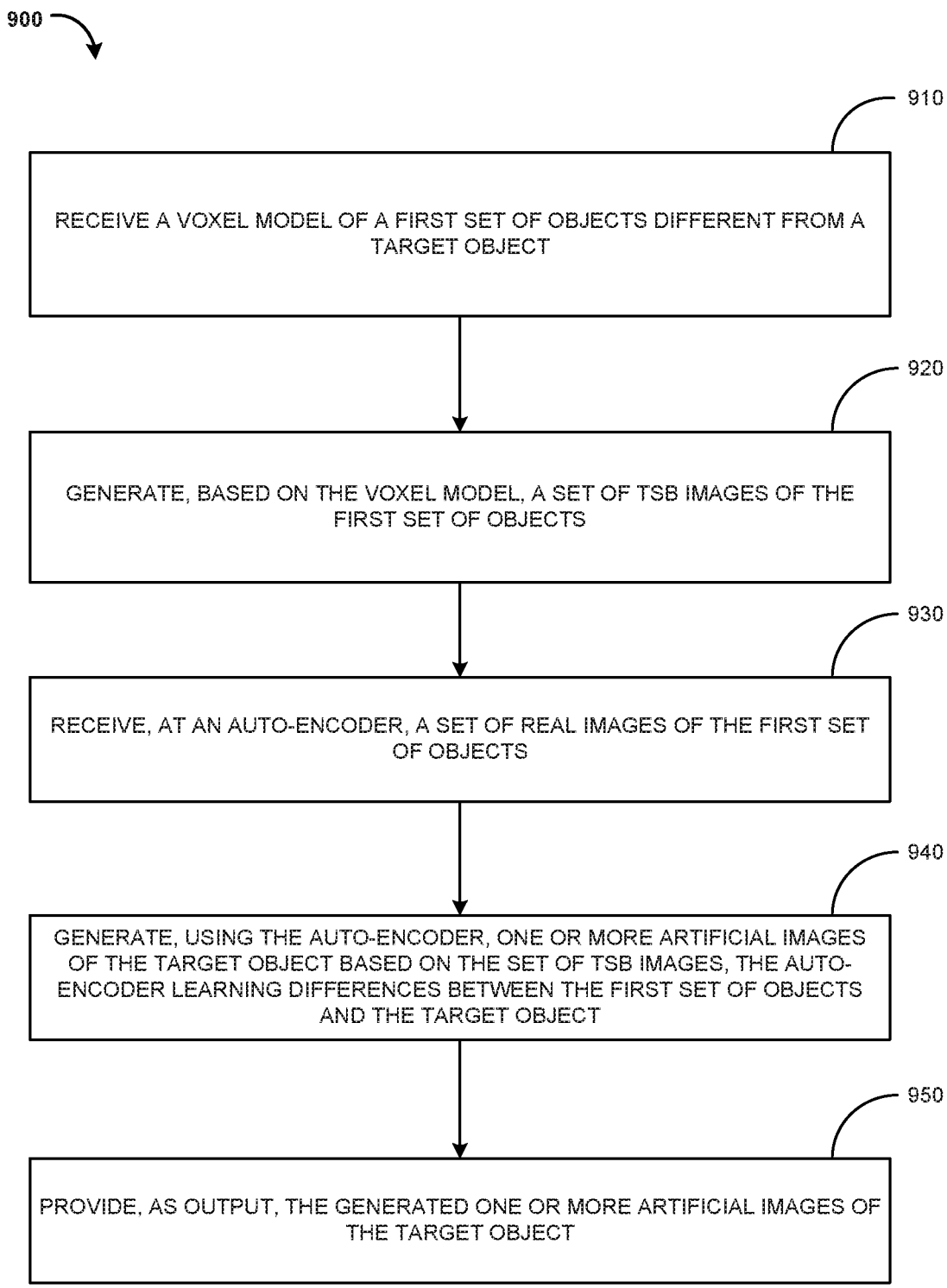
FIG. 9 is a flow chart of a second method for artificial image generation, in accordance with some embodiments.

FIG. 9 is a flow chart of a second method 900 for artificial image generation, in accordance with some embodiments. The method 900 may be implemented at computing machine(s), such as the computing machine 500. Some of the operations 910-950 of the method 900 may be similar to corresponding operations 810-850 of the method 800, with the differences indicated below and in FIGS. 8-9.

At operation 910, the computing machine(s) receive a voxel model of a first set of objects different from a target object 620. The target object is to be recognized using an image recognizer 710. In some cases, no or very few images of the target object are available. In some examples, the received input lacks real SAR images of the target object. It should be noted that, while the target object is different from the first set of objects, the target object and the first set of objects may share multiple similar features and, in some cases, are only slightly different. For example, at the end of the year 2018, when the Honda Accord® 2019 is just being released, the first set of objects may correspond to the Honda Accord® 2018 (of which many images exist), and the target object may correspond to the Honda Accord® 2019 (of which no images exist yet or very few images exist, but a set of differences between the 2018 and 2019 Honda Accord® models has been released by Honda Motor Company®).

At operation 920, the computing machine(s) generate, based on the voxel model 620, a set of TSB images 630 of the first set of objects.

At operation 930, the computing machine(s) receive, at an auto-encoder 640, a set of real SAR images 610 of the first set of objects.

At operation 940, the computing machine(s) generate, using the auto-encoder 640, one or more artificial SAR images 650 of the target object based on the set of TSB images 630. The voxel model 620 and the set of TSB images 630 are of the first set of objects. In some cases, during training, the auto-encoder learns differences between the target object and the first set of objects. The learned differences may be stored in conjunction with the set of TSB images 630. The auto-encoder 640 encodes, using the sub-encoder 641, the set of TSB images 630 (which may include, in some cases, differences between the first set of objects and the target object) into a latent vector 642. The auto-encoder 640 decodes, using a sub-decoder 643, the latent vector 642 to generate the one or more artificial SAR images 650.

At operation 950, the computing machine(s) provide, as output, the generated one or more artificial SAR images 650 of the target object. In some cases, the computing machine(s) train, using the one or more artificial SAR images 650, the image recognizer 710 to recognize the target object. The computing machine(s) provide, as output, an indication that the image recognizer has been trained. The computing machine(s) may use the image recognizer to recognize a new image of the target object, where the new image is not from among the one or more artificial SAR images 650. The new image may be generated at a later time than the training of the image recognizer. For example, the new image of the Honda Accord® 2019 may be generated during the summer of 2020. After operation 950, the method 900 ends.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

APPENDIX A

JS ON CODE FOR AUTO-ENCODER

```
{"nn_arch": [{"branches": [{"nn_arch": [{"conv_pools": [{"kernel": [1, 2, 2, 1],
"name": "generator_encode_conv1", "padding": "SAME", "shape": [5, 5, 64],
"const_init": 0.0, "type": "conv"}, {"epsilon": 1e-05, "type": "batch_norm", "name":
"generator_encode_norm1", "momentum": 0.997}, {"type": "relu", "name":
"generator_encode_relu1" {"kernel": [1, 2, 2, 1] "name":
"generator_encode_conv2", "padding": "SAME", "shape": [5, 5, 128], "const_init":
0.0, "type": "conv"}, {"epsilon": 1e-05, "type": "batch_norm", "name":
"generator_encode_norm2", "momentum": 0.997}, {"type": "relu", "name":
"generator_encode_relu2", {kernel": [1, 2, 2, 1], "name":
"generator_encode_conv3", "padding": "SAME", "shape": [5, 5, 256], "const_init":
0.0, "type": "conv"}, {"epsilon": 1e-05, "type": "batch_norm", "name":
"generator_encode_norm3", "momentum": 0.997}, {"type": "relu", "name":
"generator_encode_relu3"}]}, {"features": {"type": "flatten1D"}}, {"nn_layers":
[{"n_nodes": 256, "activation_fun": "RELU", "init_stddev": 0.04, "init_bias": 0.1,
"scope_name": "layer1", "weight_decay": 0.004, "type": "default"}]},
{"conv_pools": [{"epsilon": 1e-05, "type": "batch_norm", "name":
"generator_encode_norm5", "momentum": 0.997, "axis": 1}, {"type": "relu",
```

APPENDIX A-continued

JSON CODE FOR AUTO-ENCODER

```
"name": "generator_encode_relu5"}]}], "root_nodes": ["generator_input"], "name":
"encoder"}, {"nn_arch": [{"nn_layers": [{"n_nodes": 65536, "activation_fun":
"RELU"}, "init_stddev": 0.04, "init_bias": 0.1, "scope_name": "layer2",
"weight_decay": 0.004, "type": "default"}]}, {"conv_pools": [{"shape": [16, 16,
256], "type": "reshape", "name": "generator_decode_reshape"}, {"type":
"skip_connect", "name": "generator_decode_skip_connection_1", "skip_input":
"generator_encode_conv3_1:0", "axis": 3}, {"epsilon": 1e-05, "type":
"batch_norm", "name": "generator_decode_norm1", "momentum": 0.997}, {"type":
"relu", "name": "generator_decode_relu2"}, {"name": "generator_decode_conv2",
"padding": "SAME", "strides": [1, 2, 2, 1], "shape": [5, 5, 128], "bias_init": 0.1,
"stdev": 0.05, "type": "conv2d_transpose", "output_shape": [32, 32, 128]}, {"type":
"skip_connect", "name": "generator_decode_skip_connection_2", "skip_input":
"generator_encode_conv2_1:0", "axis": 3}, repsilon": 1e-05, "type":
"batch_norm", "name": "generator_decode_norm3", "momentum": 0.997}, {"type":
"relu", "name": "generator_decode_relu3"}, {"name": "generator_decode_conv3",
"padding": "SAME", "strides": [1, 2, 2, 1], "shape": [5, 5, 32], "bias_init": 0.1,
"stdev": 0.05, "type": "conv2d_transpose", "output_shape": [64, 64, 32]}, {"type":
"skip_connect", "name": "generator_decode_skip_connection_3", "skip_input":
"generator_encode_conv1_ 1:0", "axis": 3}, {"epsilon": 1e-05, "type":
"batch_norm", "name": "generator_decode_norm4", "momentum": 0.997}, {"type":
"relu", "name": "generator_decode_relu4"}, {"name": "generator_decode_conv5",
"padding": "SAME", "strides": [1, 2, 2, 1], "shape": [5, 5, 1], "bias_init": 0.1,
"stdev": 0.05, "type": "conv2d_transpose", "output_shape": [128, 128, 1]}, {"type",
"tanh", "name": "generator_tanh"}]}], "root_nodes": ["generator_encode_relu5"],
"name": "decoder"}]}], "driver": {"max_epochs": 10000, "save_pngs": true, "type":
"tsb_autoencoder_driver"}, data_ingest": {"real": {"test_split": 0, label":
"real_T72", "preprocessing": {"all_preprocesses": [{"crop": {"method": "center",
"size": [128, 128]}}, {"magnitude": null}, {"normalize": null}]}, "validation_split":
0, "data_loc": "/scratch/chips/Trace_0/staged/MSTAR/OnTheFly/real_T72_2018-
04-20_19:18:04.982299.staged", "type": "target_trace_dataset"}, "train_batch_size":
10, "type": "gan_dataset", "fake": {"test_split": 0, "label": "fake_T72",
"preprocessing": {"all_preprocesses": [{"crop": {"method": "center", "size": [128,
128]}}, {"magnitude": null}, {"normalize": null}]}, "validation_split": 0,
"data_loc": "/scratch/chips/Trace_0/staged/MSTAR/OnTheFly/fake_T72_2018-04-
20_19:18:04.982299.staged", "type": "target_trace_dataset"}}, "reporting":
{"analysis_plots": {"gan_images": null}, "description": "Autoencoder for T72",
"tags": "autoencoder,T72"}, "staging": {"staging_directory":
"/scratch/chips/Trace_0/staged/MSTAR/OnTheFly/", "low_bounds": [0],
"high bounds": [180], "delete_training_data_on_exit": false, "type":
"12_angle_exp", "targets": ["T72"], "db_path": "/scratch/xy15.db"}}
```

What is claimed is:

1. An image processing apparatus, the apparatus comprising:
processing circuitry and memory; the processing circuitry to:
receive a voxel model of a first set of objects different from a target object, wherein the target object is to be recognized using an image recognizer;
generate, based on the voxel model, a set of TSB (target shadow background-mask) images of the first set of objects;
receive, at an auto-encoder, a set of real images of the first set of objects;
generate, using the auto-encoder, one or more artificial images of the target object based on the set of TSB images, wherein the auto encoder encodes, using a sub-encoder, the set of TSB images into a latent vector and decodes, using a sub-decoder, the latent vector to generate the one or more artificial images, wherein the auto-encoder learns differences between the target object and the first set of objects, wherein the sub-encoder comprises a plurality of convolution pools, each convolution pool being followed by a batch normalization, and each batch normalization being followed by a ReLU (rectified linear unit), wherein a kernel size of each convolution pool is larger than a kernel size of a previous convolution pool; and
provide, as output, the generated one or more artificial images of the target object.

2. The apparatus of claim 1, wherein input received at the auto-encoder lacks real images of the target object.

3. The apparatus of claim 1, wherein the sub-encoder comprises a plurality of convolution layers and a plurality of pooling layers interspersed with the convolution layers, and wherein the sub-encoder is trained, using a machine learning training algorithm, to generate the latent vector based on the set of TSB images.

4. The apparatus of claim 1, wherein the sub-decoder comprises a plurality of deconvolution layers and a plurality of depooling layers interspersed with the deconvolution layers, and wherein the sub-decoder is trained, using a machine learning training algorithm, to generate the one or more artificial images based on the latent vector.

5. The apparatus of claim 1, wherein the processing circuitry is further to:
train, using the generated one or more artificial images, the image recognizer to recognize the target object; and
provide, as output, an indication that the image recognizer has been trained.

6. The apparatus of claim 5, wherein the processing circuitry is further to:
use the trained image recognizer to recognize a new image of the target object.

7. The apparatus of claim 5, wherein the image recognizer comprises a ResNet (residual neural network).

8. The apparatus of claim 1, wherein the sub-decoder comprises a plurality of skip connects, each skip connect being followed by a batch normalization, each batch normalization being followed by a ReLU (rectified linear unit), and each ReLU being followed by a decode convolution.

9. The apparatus of claim 8, wherein a kernel size of each decode convolution is smaller than a kernel size of a previous decode convolution.

10. A non-transitory machine-readable medium for image processing, the machine-readable medium storing instructions which, when executed by processing circuitry of one or more machines, cause the processing circuitry to:
receive a voxel model of a first set of objects different from a target object, wherein the target object is to be recognized using an image recognizer;
generate, based on the voxel model, a set of TSB (target shadow background-mask) images of the first set of objects;
receive, at an auto-encoder, a set of real images of the first set of objects;
generate, using the auto-encoder, one or more artificial images of the target object based on the set of TSB images, wherein the auto encoder encodes, using a sub-encoder, the set of TSB images into a latent vector and decodes, using a sub-decoder, the latent vector to generate the one or more artificial images, wherein the auto-encoder learns differences between the target object and the first set of objects, wherein the sub-encoder comprises a plurality of convolution pools, each convolution pool being followed by a batch normalization, and each batch normalization being followed by a ReLU (rectified linear unit), wherein a kernel size of each convolution pool is larger than a kernel size of a previous convolution pool; and
provide, as output, the generated one or more artificial images of the target object.

11. The machine-readable medium of claim 10, wherein input received at the auto-encoder lacks real images of the target object.

12. The machine-readable medium of claim 10, wherein the sub-encoder comprises a plurality of convolution layers and a plurality of pooling layers interspersed with the convolution layers, and wherein the sub-encoder is trained, using a machine learning training algorithm, to generate the latent vector based on the set of TSB images.

13. The machine-readable medium of claim 10, wherein the sub-decoder comprises a plurality of deconvolution layers and a plurality of depooling layers interspersed with the deconvolution layers, and wherein the sub-decoder is trained, using a machine learning training algorithm, to generate the one or more artificial images based on the latent vector.

14. The machine-readable medium of claim 10, wherein the processing circuitry is further to:
train, using the generated one or more artificial images, the image recognizer to recognize the target object; and
provide, as output, an indication that the image recognizer has been trained.

15. The machine-readable medium of claim 14, wherein the processing circuitry is further to:
use the trained image recognizer to recognize a new image of the target object.

16. The machine-readable medium of claim 14, wherein the image recognizer comprises a ResNet (residual neural network).

17. An image processing method comprising:
receiving a voxel model of a first set of objects different from a target object, wherein the target object is to be recognized using an image recognizer;
generating, based on the voxel model, a set of TSB (target shadow background-mask) images of the first set of objects;
receiving, at an auto-encoder, a set of real images of the first set of objects;
generate, using the auto-encoder, one or more artificial images of the target object based on the set of TSB images, wherein the auto encoder encodes, using a sub-encoder, the TSB model into a latent vector and decodes, using a sub-decoder, the latent vector to generate the one or more artificial images, wherein the auto-encoder learns differences between the target object and the first set of objects, wherein the sub-encoder comprises a plurality of convolution pools, each convolution pool being followed by a batch normalization, and each batch normalization being followed by a ReLU (rectified linear unit), wherein a kernel size of each convolution pool is larger than a kernel size of a previous convolution pool; and
providing, as output, the generated one or more artificial images of the target object.

18. The method of claim 17, wherein input received that the auto-encoder lacks real images of the target object.

* * * * *

UNITED STATES PATENT AND TRADEMARK OFFICE
CERTIFICATE OF CORRECTION

Page 1 of 1

PATENT NO. : 11,107,250 B2
APPLICATION NO. : 16/550040
DATED : August 31, 2021
INVENTOR(S) : Kim et al.

It is certified that error appears in the above-identified patent and that said Letters Patent is hereby corrected as shown below:

In the Specification

In Column 7, Line 14, delete "f$^{-1}$(x)," and insert --$f^{-1}(x)$,-- therefor In the Claims In Column 20, Line 21, in Claim 17, delete "recognizer," and insert --recognizer;-- therefor Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*